(12) United States Patent
Fielding, Jr.

(10) Patent No.: US 7,497,636 B2
(45) Date of Patent: Mar. 3, 2009

(54) WRITING INSTRUMENT WITH PAPER SOURCE DISPENSABLE UNDER A SOURCE OF POWER

(76) Inventor: Jerry Fielding, Jr., 11325 Guyn Dr., Brighton, MI (US) 48114

(*) Notice: Subject to any disclaimer, the term of this patent is extended or adjusted under 35 U.S.C. 154(b) by 559 days.

(21) Appl. No.: 11/127,602

(22) Filed: May 12, 2005

(65) Prior Publication Data

US 2005/0254883 A1    Nov. 17, 2005

Related U.S. Application Data

(60) Provisional application No. 60/570,539, filed on May 12, 2004.

(51) Int. Cl.
    *B43K 29/00* (2006.01)
(52) U.S. Cl. .............. 401/195; 401/52; 401/99
(58) Field of Classification Search ......... 401/195, 401/52, 99
    See application file for complete search history.

(56) References Cited

U.S. PATENT DOCUMENTS

| | | | |
|---|---|---|---|
| 975,465 A | 11/1910 | Schnapka | |
| 1,996,563 A | 4/1935 | Billings | 240/6.46 |
| 2,071,510 A | 2/1937 | Durrler | 120/14 |
| 2,571,620 A | 10/1951 | Sala | 120/36 |
| 2,591,874 A | 4/1952 | Ritchie | 41/10 |
| 2,846,977 A | 8/1958 | Aston | 120/42.4 |
| 3,004,140 A | 10/1961 | Gomes | 240/6.46 |
| 3,448,541 A | 6/1969 | Barlow | 46/175 |
| 3,502,859 A | 3/1970 | Kochan | 240/6.46 |
| 3,604,917 A | 9/1971 | Schmidt | 240/6.46 |
| 3,986,403 A | 10/1976 | Hurd et al. | 73/432 |
| 4,028,540 A | 6/1977 | Key, Jr. et al. | 240/6.46 |
| 4,168,521 A | 9/1979 | Bajusz | 362/118 |
| 4,336,882 A | 6/1982 | Sakwa | 206/537 |
| 4,812,069 A * | 3/1989 | White et al. | 401/195 |
| 4,964,024 A | 10/1990 | Tsay | 362/118 |
| 5,007,756 A | 4/1991 | Wey | 401/195 |
| D345,991 S | 4/1994 | Tzong-Taur | D19/36 |
| D356,113 S | 3/1995 | Maggio | D19/36 |
| 5,938,359 A | 8/1999 | Kim | 401/195 |
| 5,944,436 A | 8/1999 | Huang | 401/109 |
| 6,004,597 A | 12/1999 | Coleman et al. | 426/112 |
| 6,092,951 A | 7/2000 | Greene et al. | 401/99 |
| 6,152,634 A | 11/2000 | Kim | 401/195 |
| 6,164,856 A | 12/2000 | Lo | 401/52 |
| D439,612 S | 3/2001 | Jones | D19/36 |
| 6,270,274 B1 | 8/2001 | Chao | 401/195 |
| 6,283,661 B1 * | 9/2001 | Connors | 401/195 |
| RE37,640 E | 4/2002 | Conner | 351/158 |
| 6,422,974 B1 | 7/2002 | Schimmel | 482/44 |
| D465,240 S | 11/2002 | Jones | D19/51 |
| 6,589,094 B2 | 7/2003 | Spencer | 446/242 |
| 7,040,829 B2 * | 5/2006 | Lin | 401/195 |
| 2004/0056949 A1 | 3/2004 | Lin | 248/61 |

* cited by examiner

*Primary Examiner*—David J Walczak
(74) *Attorney, Agent, or Firm*—Harness, Dickey & Pierce P.L.C.

(57) ABSTRACT

A writing instrument includes a writing cartridge, a paper supply, and a drive unit disposed within a housing. The drive unit is connected to the paper supply and selectively actuates the paper supply to dispense paper from the housing. In addition, the writing instrument may further include another drive unit connected to the writing cartridge to selectively extend and retract the writing cartridge from a tip of the housing.

16 Claims, 6 Drawing Sheets

WRITING INSTRUMENT WITH PAPER SOURCE DISPENSABLE UNDER A SOURCE OF POWER

CROSS-REFERENCE TO RELATED APPLICATIONS

This application claims the benefit of U.S. Provisional Application No. 60/570,539 filed on May 12, 2004. This related application is hereby incorporated by reference as if fully set forth herein.

FIELD OF THE INVENTION

The present invention relates to writing instruments and more particularly to an improved writing instrument incorporating a dispensable paper source driven by a power source.

BACKGROUND OF THE INVENTION

Writing instruments such as pens and pencils have been widely known for many years. Such instruments are generally used in combination with a separate source of paper or other medium to take notes, write memos, or otherwise memorialize a thought or expression. As is known, pencils serve to transfer a supply of lead to the paper source while pens generally transfer a supply of ink to the paper source to thereby mark the paper. In either event, the lead or ink of the particular writing device cooperates with the paper to effectively memorialize the thought of the writer.

Many conventional writing instruments provide the user with the ability to selectively retract a lead or ink cartridge so that the lead or ink supply is effectively disposed within a housing of the writing instrument. Such writing instruments are generally referred to as "mechanical" wiring instruments, as retraction of the lead or ink typically requires a plurality of moving parts within the housing of the writing instrument. When the lead or ink supply is in the retracted position, use of the writing instrument is prohibited. Prohibiting use of the writing instrument when the lead or ink is in the retracted position allows the user to prevent inadvertent markings when the writing instrument in not in use.

While conventional writing instruments provide the user with the ability to transfer a thought to paper, conventional writing instruments suffer from the disadvantage of requiring a user to acquire a piece of paper or other medium prior to using the writing instrument. Furthermore, while conventional writing instruments provide the user with the ability to selectively retract and extend a lead or ink cartridge, conventional writing instruments suffer from the disadvantage of requiring a user to apply a force directly to a lead or ink cartridge to thereby move the cartridge into the desirable position.

Therefore, a writing instrument incorporating a paper supply and a power source capable of distributing the paper supply to the user is desirable in the industry. In addition, a writing instrument having a power supply capable of articulating a lead or ink cartridge into a usable position through manipulation of a push button is also desirable.

SUMMARY OF THE INVENTION

Accordingly, a writing instrument having a writing cartridge, a paper supply, and a drive unit disposed within a housing is provided. The drive unit is connected to the paper supply and selectively actuates the paper supply to dispense paper from the housing. In addition, the writing instrument may further include another drive unit connected to the writing cartridge to selectively extend and retract the writing cartridge from a tip of the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
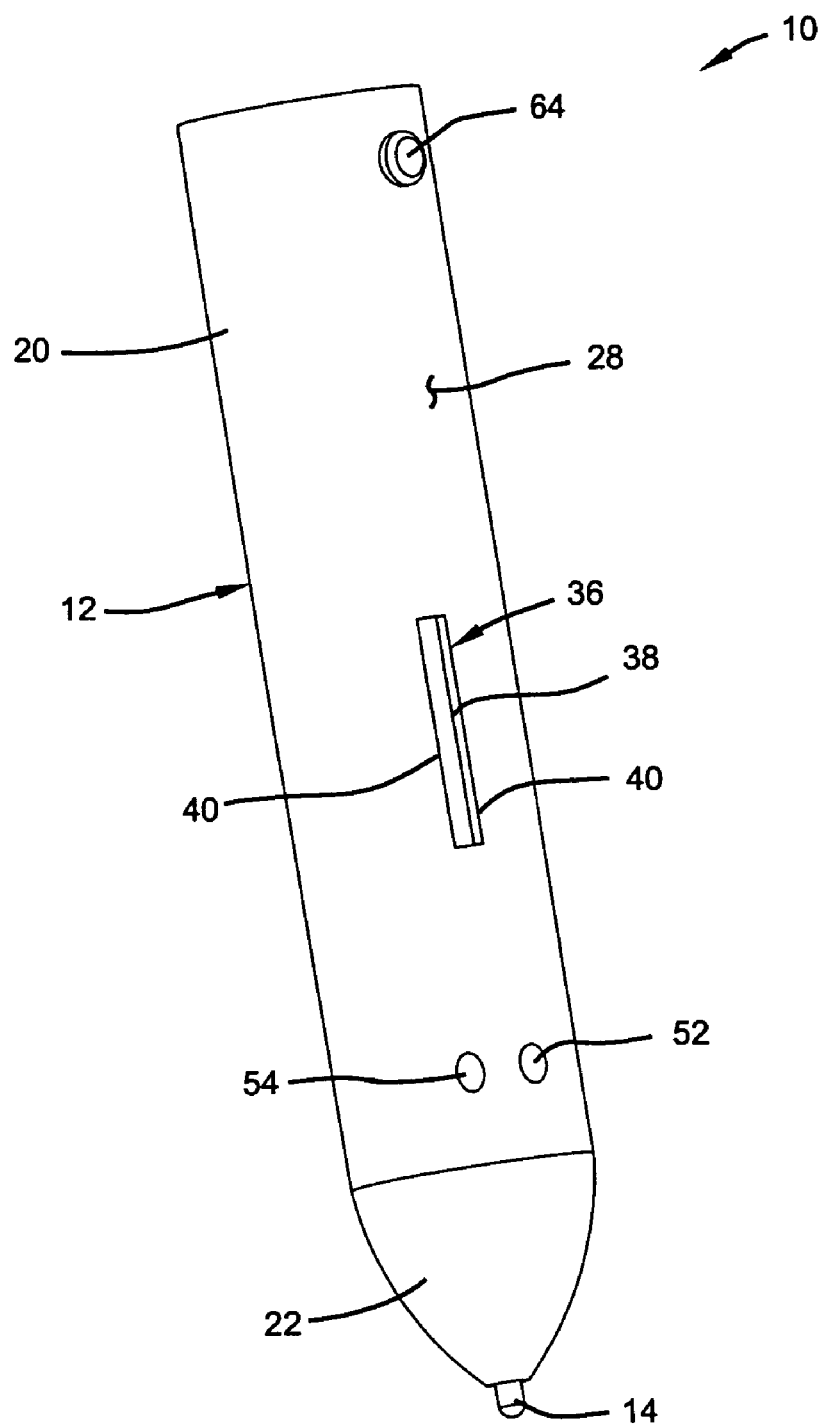
FIG. 1 is a perspective view of a writing instrument in accordance with the principals of the present invention.

The following description of the preferred embodiment(s) is merely exemplary in nature and is in no way intended to limit the invention, its application, or uses.

With reference to the figures, a writing instrument 10 is provided and includes a housing 12 operably supporting a writing cartridge 14, a paper supply 16, and a drive unit 18. The writing cartridge 14 provides either a supply of lead or ink for use in writing and is generally movable between a retracted position and an extended position. The drive unit 18 is operably attached to the paper supply 16 and serves to selectively actuate the paper supply 16 to thereby deliver a supply of paper to a user.

Figure 2:
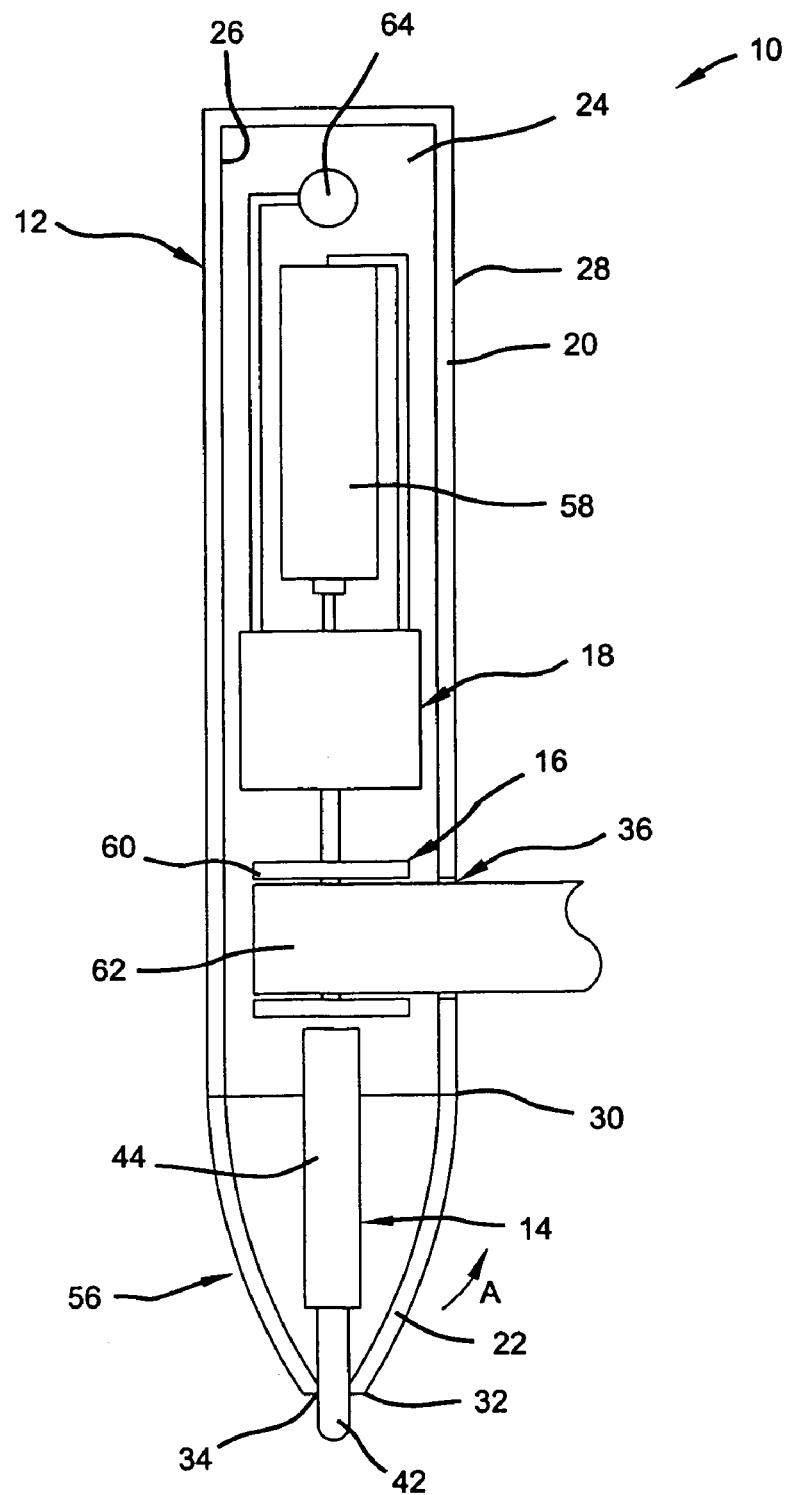
FIG. 2 is a cross-sectional view of the writing instrument of FIG. 1 incorporating a paper supply driven by a power source.

With reference to FIG. 2, the housing 12 is shown to include an upper portion 20 and a lower portion 22, cooperating to form an interior space 24. The upper portion 20 includes a generally cylindrical shape having an inner surface 26 and an outer surface 28. The lower portion 22 includes a generally frustoconical shape having a first end 30 disposed proximate to the upper portion 20 and a second end 32 having an aperture 34 formed therethrough. The aperture 34 provides clearance for the writing cartridge 14 to selectively protrude from the housing 12 when in the extended position.

The housing 12 further includes a tear slot 36 formed generally between the inner and outer surfaces 26, 28 of the upper portion 20. The tear slot 36 provides an opening into the interior space 24 of the housing 12 and allows the paper supply 16 to be fed through the upper portion 20 of the housing 12. In addition, the tear slot 36 may include a sharp or serrated edge 38 to aid in tearing paper from the paper supply 16. The sharp edge 38 may be formed along the entire length of the slot 36 or, alternatively, may be locally formed at a predetermined location along either or both longitudinal edges 40 (FIG. 1).

The writing cartridge 14 may be either a lead cartridge or an ink cartridge, depending on the particular writing instrument (i.e., a pencil or pen). In either case, the writing cartridge 14 extends along a length of the housing 12 and is moveable between a retracted position and an extended position. In the retracted position, the writing cartridge 14 is disposed entirely within the housing 12 such that writing is prohibited. In the extended position, a writing tip 42 protrudes from aperture 34 of the housing 12 such that writing is permitted. In addition, the writing cartridge 14 includes a generally cylindrical body 44 extending from the tip 42 (FIG. 2). The cylindrical body 44 is formed from lead for a pencil application and is formed from a suitable tubing for storing ink in a pen application. In either event, the tip 42 is selectively extended from the lower portion 22 for writing.

Figure 3:
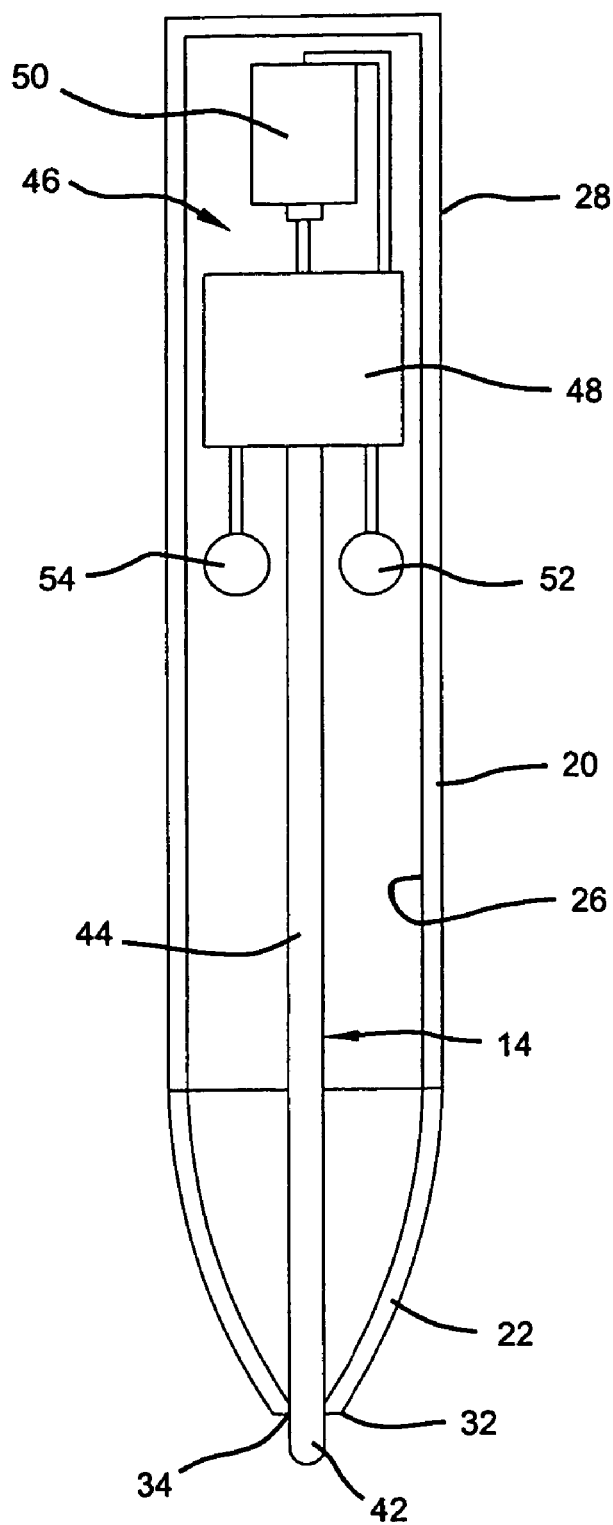
FIG. 3 is a cross-sectional view of the writing instrument of FIG. 1 incorporating a power source capable of retracting and extending a lead or ink cartridge.
Figure 4:
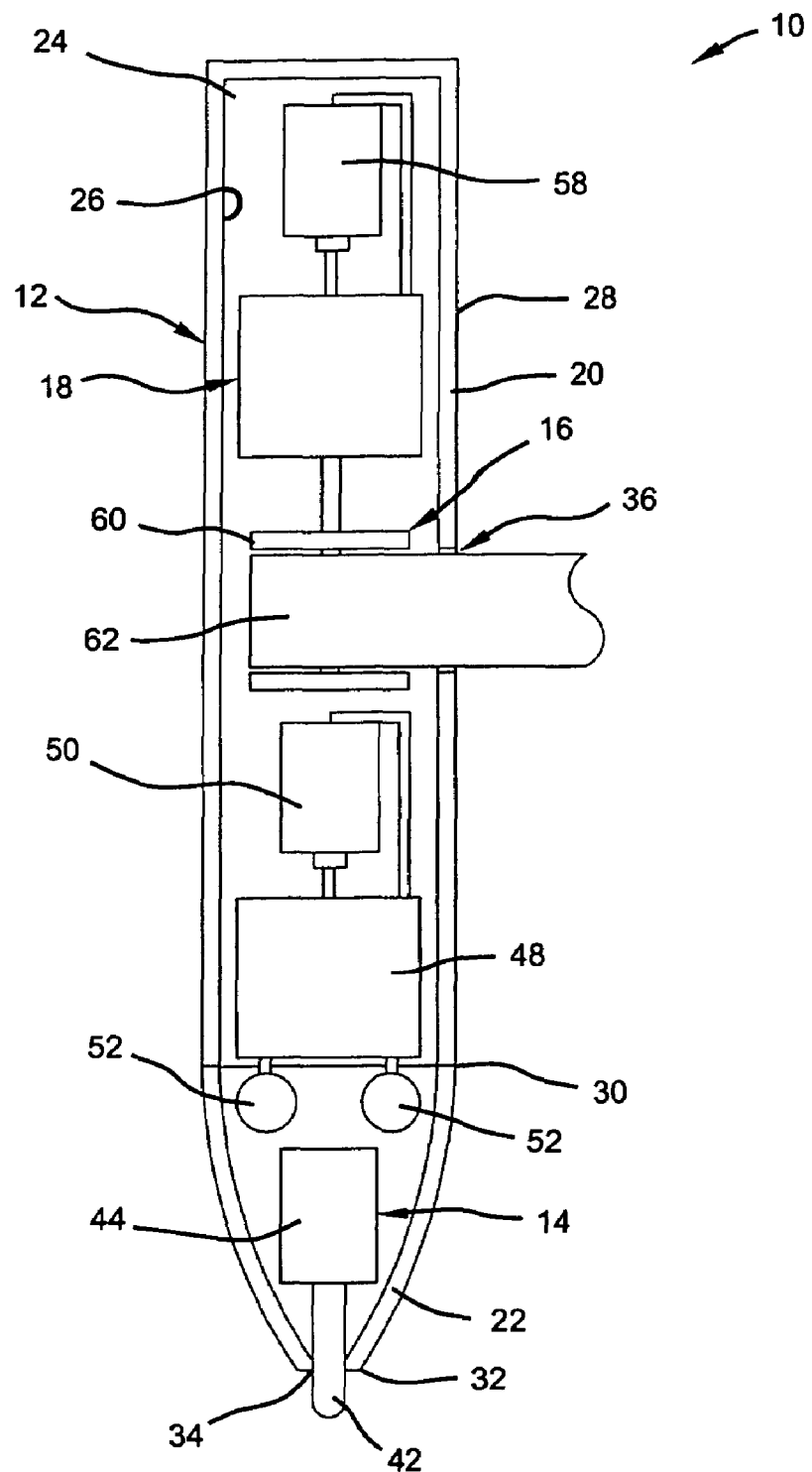
FIG. 4 is a cross-sectional view of FIG. 1 incorporating a paper supply driven by a power source and a power source capable of selectively retracting and extending a lead or ink cartridge.

With particular reference to FIGS. 3-4, the writing cartridge 14 is shown incorporated into a powered extension and retraction device 46. The powered extension and retraction device 46 includes a drive unit 48, a power source 50, and a pair of actuation buttons 52, 54. The drive unit 48 and power source 50 cooperate to toggle the writing cartridge 14 between the retracted and extended positions. It should be noted that the power source 50 may be any suitable power source such as, but not limited to, a battery. Furthermore, it should be noted that the drive unit 48 may be any suitable drive unit capable of imparting an axial force on the writing cartridge 14, such as, but not limited to, a DC motor.

In operation, a user depresses the actuation button 52 to connect the drive unit 48 to the power source 50. Once the power source 50 is connected to the drive unit 48, the drive unit 48 imparts a force on the writing cartridge 14 to extend the cartridge 14 into the use position. At this point, the cartridge 14 extends from the housing 12 and may be applied to a medium for writing.

Once the user is finished writing, a force may be applied to actuation button 54 to connect the power source 50 to the drive unit 48 and retract the cartridge 14 into the housing 12. Once retracted, the cartridge 14 is disposed wholly within the interior space 24 of the housing 12 and does not extend from the lower portion 22. As described, the actuation buttons 52, 54 selectively connect the power supply 50 to the drive unit 48 to selectively toggle the writing cartridge 14 between the retracted and extended positions.

Figure 5:
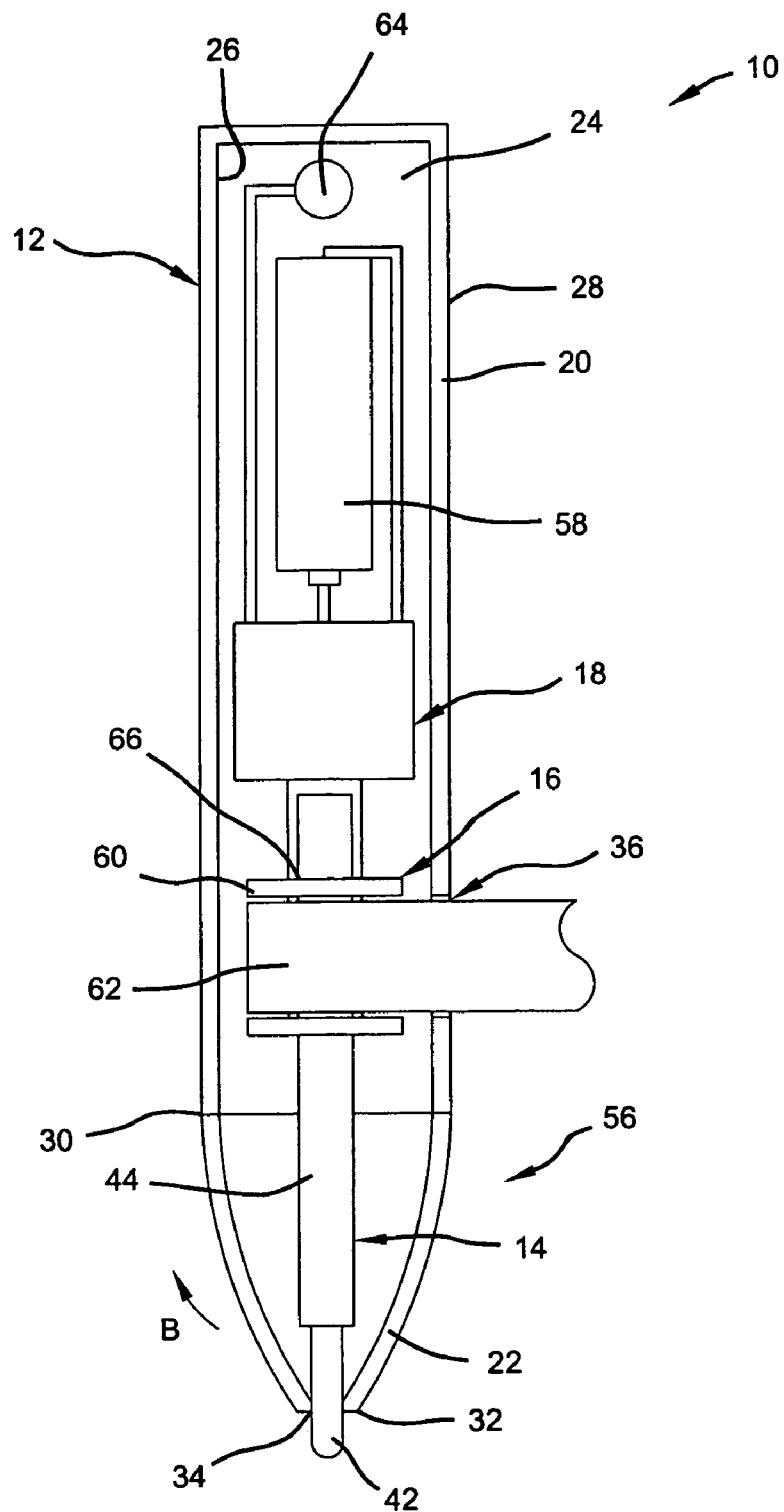
FIG. 5 is a cross-sectional view of FIG. 1 incorporating a paper supply driven by a power source and a lead or ink cartridge extending through the paper supply.

With particular reference to FIGS. 2 and 5, the writing cartridge 14 is shown incorporated into a manual retraction and extension device 56. The manual retraction and extension device 56 utilizes the lower portion 22 of the housing 12 to toggle the writing cartridge 14 between the retracted and extended positions. Specifically, as a rotational force is applied to the lower portion 22 of the housing 12 in a first direction A (shown in FIG. 2), the lower portion 22 is rotated relative to the upper portion 20 and the writing cartridge 14 is caused to translate relative to the housing 12. Continued rotation of the lower portion 22 causes the tip 42 to eventually protrude through aperture 34 until the cartridge 14 is in the extended position.

Once the user is finished writing, a rotational force is again applied to the lower portion 22 of the housing 12 in a second direction B (shown in FIG. 5), such that the lower portion 22 is rotated relative to the upper portion 20 and the writing cartridge 14 is caused to translate relative to the housing 12. Continued rotation of the lower portion 22 in direction B causes the tip 42 to eventually retract from aperture 34 until the cartridge 14 is fully disposed within the inter space 24 of the housing 12. At this point, the cartridge 14 is disposed entirely within the housing 12 and the writing instrument 10 cannot be used for writing.

As described, the writing instrument 10 may incorporate either powered extension and retraction device 46, as shown in FIGS. 3-4, or the manual retraction and extension device 56, as shown in FIGS. 2 and 5 for use in selectively toggling the writing cartridge 14 between the retracted and extended positions.

The drive unit 18 is operably attached to the paper supply 16 and serves to selectively actuate the paper supply 16 to deliver a supply of paper to a user. The drive unit 18 is disposed generally within the interior space 24 of the housing 12 and is connected to a power source 58. The power source 58 serves to selectively supply the drive unit 18 with power to actuate the paper supply 16. It should be noted that the power source 58 may be any suitable power source such as, but not limited to, a battery. Furthermore, it should also be noted that the drive unit 18 may be any suitable drive unit capable of imparting a rotational force on the paper supply 16, such as, but not limited to, a DC motor.

The paper supply 16 includes a spool 60 and a supply of paper 62. The paper 62 is generally wound around the spool 60 such that rotation of the spool 60 in a direction opposite to the wound paper 62 causes the paper 62 to unravel (FIGS. 2 and 4-5). The spool 60 is rotatably supported within the housing 12 and is positioned such that the paper 62 is aligned with the tear slot 36. Therefore, as the spool 60 is rotated relative to the housing 12, and the paper 62 is unwound, paper 62 is fed through the tear slot 36. As previously discussed, the tear slot 36 includes a sharp edge 38 and thus, allows the user to cut the paper 62 once a sufficient amount is expelled through slot 36.

As shown in FIG. 5, the spool 60 may further include a bore 66 formed therethrough for interaction with the writing cartridge 14. Interaction between the spool 60 and the writing cartridge 14 allows the writing cartridge 14 to extend through the spool 60 and provide for a longer cartridge 14. A longer writing cartridge 14 provides the writing instrument 10 with the ability to carry additional lead or ink, depending on the particular application and, thus, improves the longevity and overall performance of the instrument 10.

In operation, a user applies a force to an actuation button 64 to unwind the paper 62 from the spool 60. The actuation button 64 is connected to the power source 58 such that as the button 64 is depressed, power is supplied to the drive unit 18. Once the drive unit 18 receives power from the power supply 58, the drive unit 18 imparts a rotational force on the spool 60, via any suitable mechanism, such as an output shaft, thereby causing the spool 60 to rotate. As previously discussed, rotation of the spool 60 causes the paper 62 to unravel and exit the housing 12 via tear slot 36.

Once a sufficient amount of paper 62 is unraveled, the actuation button 64 is released such that power is restricted from the drive unit 18. At this point, a force may be applied to the unraveled paper 62 to force the unraveled paper 62 against the sharp edge 38 of the tear slot 36. Forcing the unraveled paper 62 against the tear slot 36 causes the unraveled paper 62 to become severed from the writing instrument 10 entirely. The severed paper 62 may now be used in conjunction with the writing instrument 10 for jotting a note or memo.

FIGS. 2-5 show various configurations of the writing instrument 10 of the present invention selectively incorporating at least one of the powered extension and retraction device 46, manual retraction and extension device 56, and powered paper supply 16. It should be noted, however, that FIGS. 2-5 are intended to provide illustrative examples of the various possible combinations, and are not intended to limit the application of the present invention.

Figure 6:
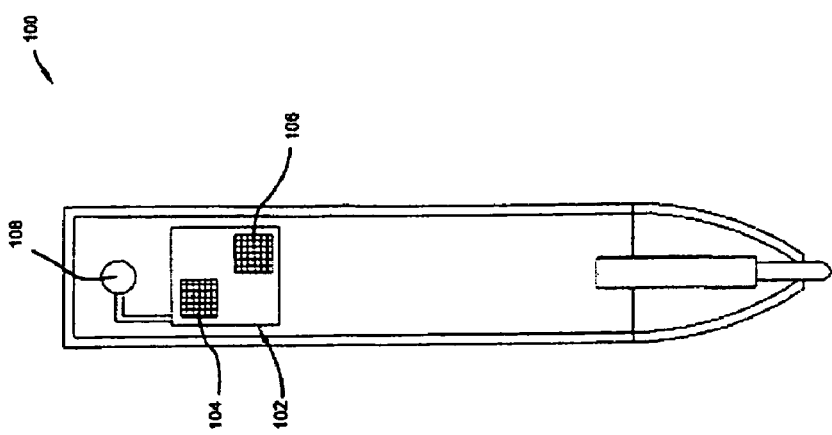
FIG. 6 is a cross-sectional view of an alternatively constructed pen including a digital recorder.

With reference to FIG. 6 a cross-sectional view of a pen 100 constructed to include a digital recording mechanism 102 is illustrated. The digital recording mechanism 102 includes a mike portion 104 and a speaker portion 106. In an otherwise conventional manner, the digital recording mechanism 102 is operative for audio recording upon depression of a control button 108. In this manner, the pen 100 equips the user with a convenient device for both recording sound and writing. It will be understood that the digital recording mechanism 102 may be used alone or in combination with any of the features of the writing instrument 10 discussed above.

Figure 7:
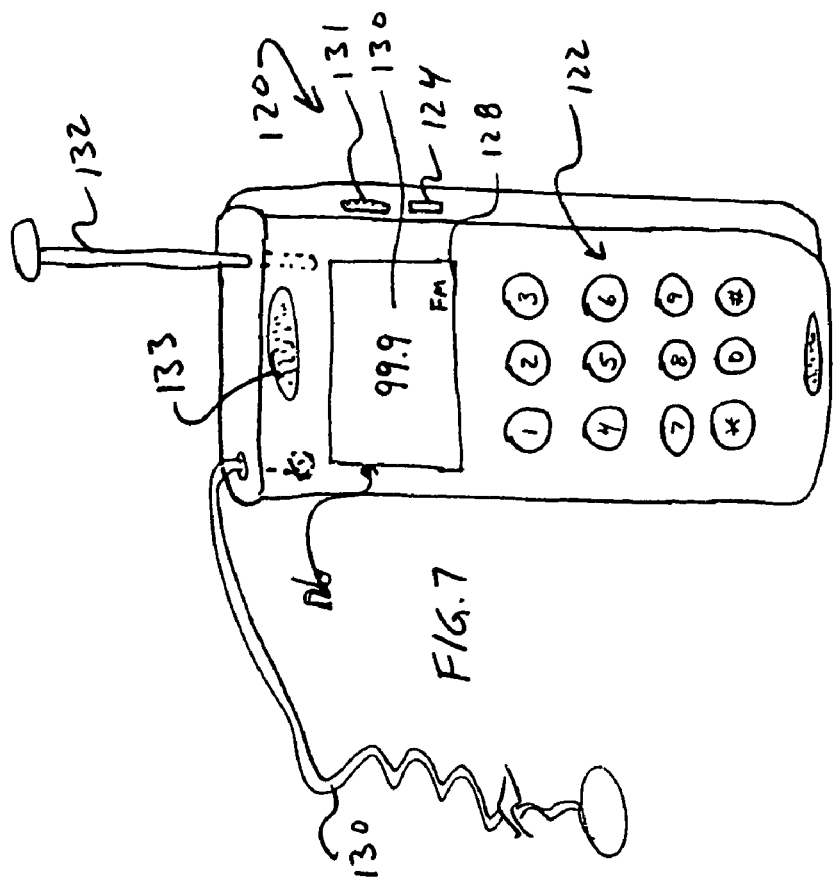
FIG. 7 is a simplified view of a cellular telephone incorporating a radio tuner.

Turning to FIG. 7, a cellular telephone 120 constructed in accordance with teachings of the present invention is illustrated. In a conventional manner, the cellular telephone 120 is illustrated to include a numeric keypad 122 for dialing telephone numbers. Insofar as the present invention is concerned, the telephonic functions of the cellular telephone 120 will be understood to be conventional.

The cellular telephone 120 will be understood to additionally provide a source for listening to radio. In this regard, the cellular telephone 120 includes a mode button 124 for toggling between multiple functions. In the embodiment illustrated, the mode button 124 operates to toggle between a telephone mode and a radio mode. While not part of the present invention, the device 120 may be constructed such that the mode button 124 may also toggle between personal organizer functions such as a calendar and a list of contacts, for example.

The handheld device 120 is illustrated to include a display 126. The display may be a liquid crystal display (LCD) or other type of display. When in the radio mode, the display 126 of the device 10 displays the radio band 128 and the radio station 130. The device 120 includes a wheel 131 for changing the radio station 130. The band is changed through the mode button 124.

The device 120 is shown to further include an extendable antenna 132. The antenna functions to receive cellular telephone signals in a conventional manner. The antenna further functions to receive radio signals. In this regard, the antenna is a dual function antenna.

In the particular embodiment illustrated, the device 120 includes a receiver and a turner (not specifically identified in the drawings). The receiver and tuner are conventional in constructions and operation for receiving radio frequency (RF) signals on both the FM band and the AM band. Alternatively, the device 120 may be constructed to receive satellite radio signals.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A writing instrument comprising:
a housing;
a writing cartridge disposed within said housing;
a paper supply disposed within said housing;
a drive unit operably connected to said paper supply, said drive unit operable to selectively actuate said paper supply and dispense paper from said housing; and
a battery disposed in the housing and operably connected to said drive unit for advancing the paper supply from the housing under battery power.

2. The writing instrument of claim 1, wherein said housing further includes a slot, said slot providing access into said housing.

3. The writing instrument of claim 2, wherein said slot includes a tear edge, said tear edge disposed proximate to said paper supply and operable to sever dispensed paper.

4. The writing instrument of claim 1, wherein said drive unit is a DC motor, said DC motor operable to selectively rotate said paper supply.

5. The writing instrument of claim 1, wherein said writing cartridge is a lead cartridge.

6. The writing instrument of claim 1, wherein said writing cartridge is an ink cartridge.

7. The writing instrument of claim 1, further including a push button, said push button operably connected to said drive unit and adapted to selectively supply power from said battery to said drive unit.

8. The writing instrument of claim 1, further including a second drive unit, said second drive unit operable to translate said writing cartridge between a retracted position and an extended position.

9. The writing instrument of claim 1, wherein said housing includes a body portion and a tip portion, said tip portion rotatable relative to said body portion to selectively position said writing cartridge between an extended position and a retracted position.

10. The writing instrument of claim 1, wherein said writing cartridge extends through a spool of said paper supply.

11. The writing instrument of claim 1, wherein said paper supply is a spool of paper, said spool of paper rotatably driven by an output of said drive unit.

12. The writing instrument of claim 1, further comprising a digital recording mechanism.

13. The writing instrument of claim 1, wherein the housing includes an upper portion and a lower portion, the upper portion being generally cylindrical and containing the paper supply, the battery and drive unit, the lower portion being generally frustoconical and substantially including the writing cartridge, the writing cartridge upwardly terminating before the paper supply.

14. The writing instrument of claim 1, wherein the drive unit includes a battery driven motor and an output shaft coupled to the paper supply for driving the paper supply.

15. The writing instrument of claim 1, wherein the drive unit includes a motor for imparting a rotational force on the paper supply for driving the paper supply from the housing.

16. A writing instrument comprising:
a housing;
a writing cartridge disposed within said housing;
a paper supply disposed within said housing;
a motor disposed in the housing operably connected to said paper supply, the motor for imparting a rotational force on the paper supply; and
a battery disposed in the housing and operably connected to said motor for advancing the paper supply from the housing under battery power.

* * * * *